US008350917B2

(12) United States Patent
Oka et al.

(10) Patent No.: US 8,350,917 B2
(45) Date of Patent: Jan. 8, 2013

(54) DIGITAL CAMERA, METHOD FOR SENDING IMAGE DATA AND SYSTEM FOR TRANSMITTING AND RECEIVING IMAGE DATA

(75) Inventors: Koji Oka, Ohta-ku (JP); Naoki Tsunoda, Ohta-ku (JP)

(73) Assignee: Ricoh Company, Ltd., Tokyo (JP)

( * ) Notice: Subject to any disclaimer, the term of this patent is extended or adjusted under 35 U.S.C. 154(b) by 3335 days.

(21) Appl. No.: 10/658,549

(22) Filed: Sep. 10, 2003

(65) Prior Publication Data

US 2004/0125214 A1 Jul. 1, 2004

(30) Foreign Application Priority Data

Sep. 11, 2002 (JP) ................................. 2002-265011
Mar. 19, 2003 (JP) ................................. 2003-076040

(51) Int. Cl.
*H04N 5/232* (2006.01)
*H04N 5/225* (2006.01)

(52) U.S. Cl. ............. 348/211.11; 348/207.1; 348/E7.07
(58) Field of Classification Search ............... 348/207.1, 348/207.11, 207.2, 211.11, 211.12, E7.07, 348/E7.072, E7.081
See application file for complete search history.

(56) References Cited

U.S. PATENT DOCUMENTS

| 5,521,335 | A | 5/1996 | Oka |
| 5,745,688 | A | 4/1998 | Oka |
| 5,760,345 | A | 6/1998 | Oka |
| 5,835,081 | A | 11/1998 | Oka |
| 7,173,651 | B1* | 2/2007 | Knowles .................... 348/207.1 |
| 2003/0046445 | A1* | 3/2003 | Witt et al. .................... 709/321 |
| 2003/0065822 | A1* | 4/2003 | Avery ........................... 709/250 |
| 2003/0071903 | A1* | 4/2003 | Nakami .................... 348/221.1 |
| 2003/0202104 | A1* | 10/2003 | Werner .................... 348/207.99 |
| 2003/0225824 | A1* | 12/2003 | Wu et al. ...................... 709/203 |
| 2004/0003409 | A1* | 1/2004 | Berstis .......................... 725/105 |
| 2004/0004737 | A1* | 1/2004 | Kahn et al. .................. 358/1.15 |
| 2005/0220117 | A1* | 10/2005 | Omi et al. .................. 370/395.4 |
| 2006/0265482 | A1* | 11/2006 | Trisno et al. .................. 709/222 |

FOREIGN PATENT DOCUMENTS

JP 2000-339248 12/2000
JP 2003-143518 * 5/2003

OTHER PUBLICATIONS

U.S. Appl. No. 10/892,307, filed Jul. 16, 2004, Oka.
U.S. Appl. No. 10/026,624, filed Dec. 27, 2001, Tsunoda.
U.S. Appl. No. 10/354,086, filed Jan. 30, 2001, Ojima et al.

* cited by examiner

*Primary Examiner* — Hung Lam
(74) *Attorney, Agent, or Firm* — Oblon, Spivak, McClelland, Maier & Neustadt, L.L.P.

(57) ABSTRACT

A digital camera (1) which includes an external memory device (12) to store image data, a communication device (15) connected to LAN to conduct a data communication, and a control section (10) to control these. Request data is broadcast to the LAN by the camera, and when data responding to the request data is received from a device connected to the LAN, the control section detects an IP address of the equipment from which the response data is sent, and the control section (10) sends the image data to the IP address.

5 Claims, 15 Drawing Sheets

DIGITAL CAMERA, METHOD FOR SENDING IMAGE DATA AND SYSTEM FOR TRANSMITTING AND RECEIVING IMAGE DATA

BACKGROUND OF THE INVENTION

1. Field of the Invention

The present invention relates to a digital camera which is capable of sending the image data to equipment connected to a local area network (LAN). The present invention further relates to a method for sending the image data of the digital camera and a system for sending and receiving the image data of the digital camera.

2. Description of the Prior Art

There has been frequently utilized a method for sending image data of a digital camera. Conventionally, when the image data imaged by the digital camera are sent to a terminal equipment (a equipment and an information terminal equipment) such as a computer or the like, which is connected to a LAN, a processing for sending is carried out through a user by specifying the terminal device of a destination after the image data are once loaded into a terminal equipment (a terminal equipment different form the terminal equipment of a destination) such as a hard disk or the like.

A communication method described in, for example, Japanese Paten Laid-Open 2000-339248 has been known as a method for sending data directly from a pervasive computing device such as a digital camera or the like.

However, the above-mentioned method for sending the image data by specifying the terminal equipment of the destination after the image data are once loaded into the terminal equipment, which is different from the terminal equipment of the destination, has problems in which many times and troublesomeness take in sending the image data because the image data has to be loaded into the terminal equipment which is not the terminal equipment of the destination, and the user has to input a host name and an IP address to specify the destination.

The communication method as described in Japanese Patent Laid-Open 2000-339248 does not clearly mention about sending image data of a digital camera. Furthermore, the method does not mention about means for specifying a destination when the image data are sent selectively to the other pervasive computing device, so that the above-mentioned problem is not solved.

SUMMARY OF THE INVENTION

It is, therefore, an object of the present invention is to exclude an existence of equipment which is not a destination when image data are sent to equipment which is connected to LAN, and to provide a digital camera, which is capable of reducing a task of specifying the destination by a user. It is also the object of the present invention to provide a method for sending image data of the digital camera and a system for sending and receiving the image data In order to achieve the above-mentioned object, according to a first aspect of the present invention, a digital camera has a device for storing image data, a communication device connected to a local area network to conduct a data communication, and a control device to control the storing device and the communication device. The control device sends request data with a broadcast to the local area network by the communication device, and when data for responding to the request data are received from a equipment which is connected to the local area network, the control device detects an IP address of the equipment from which the response data is sent, and sends the image data which is stored in the storing device to the equipment which includes the detected IP address.

In the one embodiment of the present invention, the digital camera further includes a display device to display a list of the IP addresses detected by the control device or a list of the equipment which corresponds to the IP addresses, and a selection device to select one or more IP address or the equipment displayed on the list. The control device sends the image data stored in the storing device to the equipment which includes the IP address selected by the selection device or the equipment which is selected by the selection device.

Moreover, if the IP address detected within a predetermined time after the request data is sent is one, the control device automatically sends the image data stored in the storing device to the equipment which includes the IP address.

In the other embodiment of the present invention, the above-mentioned digital camera further includes a device for instructing a transmission to instruct the control device for sending the image data stored in the storing device, and a device for storing an address to store a destination when image data stored in the storing device are sent. When the control device receives the instruction of sending from the instructing device with a condition in which the destination is stored in the address storing device, the control device sends the image data stored in the storing device to the destination stored in the address storing device.

In the other embodiment of the present invention, the above-mentioned digital camera further includes a device for instructing a transmission to instruct the control device for sending the image data stored in the storing device. The control device sequentially makes the list by repeatedly conducting processing for detecting the IP address, and when the control device receives the instruction of sending from the instructing device, displays a latest list, which is made at this point, on the display device.

According to the other aspect of the present invention, in a method for sending image data of a digital camera, the digital camera includes a device for storing image data, a communication device connected to a local area network to conduct a data communication, and a control device to control the storing device and the communication device. In this method, the digital camera sends the image data stored in the storing device through the local area network. In this method, the control device includes a request step for sending request data with a broadcast to the local area network by the communication device, a response step for detecting an IP address of a device in which a response data are sent when the response data with respect to the request data are received from the equipment connected to the local area network, and a transmission step for sending the image data stored in the storing device to the equipment which includes the detected IP address.

According to the other aspect of the present invention, a system for sending and receiving image data includes a digital camera and terminal equipment. The digital camera has a device for storing image data, a communication device connected to a local area network to conduct a data communication, and a camera control device to detect an IP address of a destination from request data which are received through the local area network by the communication device, and to send response data which include an IP address of own to the IP address of the detected destination, and when data for requiring an image data transmission are received from the destination replied with respect to the response data, the camera control device sends the image data stored in the storing device to the destination in accordance with the data for requiring the image data transmission. The terminal equipment has a terminal communication device connected to the local area network to conduct a data transmission, and a terminal control device to send the request data with a broadcast to the local area network by the terminal communication device, and to detect the IP address of the digital camera by the response data when the response data with respect to the request data are received, and to send data for requiring an image data transmission to the detected IP address, and to obtain the image data from the digital camera replied in accordance with the data for requiring the image data transmission.

In one embodiment of this system for sending and receiving image data, the terminal equipment includes a display device for a terminal equipment to display a list of the IP address of the digital camera detected by the terminal control device or a list of the digital camera which includes the IP address and a selection device for a terminal equipment to select the IP address or the digital camera displayed on the list, and the terminal control device sends the data for requiring the image data transmission to the digital camera which includes the IP address selected by the selection device for the terminal equipment or to the digital camera selected by the selection device for the terminal equipment.

In the other embodiment, in accordance with the response data replied within a predetermined time, when the terminal control device judges that the digital camera which is connected to the local area network is one, the terminal control device sends automatically the data for requiring the image data transmission to the digital camera.

In the other embodiment, the terminal equipment includes a device for sending an instruction to a terminal equipment to instruct the terminal control device for sending the data for requiring the image data transmission, and a device for storing a destination to store the destination when the data for requiring the image data transmission are sent, and when the terminal control device receives the instruction of sending from the device for sending the instruction to the terminal equipment with a condition in which the destination is stored in the device for storing the destination, sends the data for requiring the image data transmission to the destination stored in the device for storing the destination.

Moreover, in the system for sending and receiving image data, further includes a device for sending an instruction to a terminal to instruct the terminal control device for sending the data for requiring the image data transmission. The terminal control device sequentially makes the list by repeatedly conducting a processing for detecting the IP address, and when the instruction of sending is received from the device for sending the instruction to the terminal equipment, displays a latest list which is displayed at this point on the display device for the terminal equipment.

According to the other aspect of the present invention, a system for sending and receiving image data includes a digital camera and terminal equipment. The digital camera has a device for storing image data, a communication device connected to a local area network to conduct an image communication, and a camera control device to send information data including an IP address of own with a broadcast through the local area network by the communication device. The terminal equipment has a terminal communication device connected to the local area network to conduct a data communication, and a terminal control device to send the information data through the local area network by the terminal communication device, and to detect the IP address of the digital camera by the information data, and to make a list of the IP address, or a list of the digital camera which has the IP address, and to send data for requiring an image data transmission to any of the IP addresses of the digital cameras in the list, and to obtain the image data from the digital camera replied in accordance with the data for requiring the image data transmission.

In the system for sending and receiving image data, the camera control device sends data for informing of a completion through the local area network before a power is turned off or before the data communication is disconnected by the communication device, and when the terminal control device receives the data for informing the completion through the terminal communication device, deletes a digital camera in which the said data for informing the completion are received from the list.

Moreover, in the system for sending and receiving image data, the terminal equipment includes a display device for a terminal equipment to display the list of the IP address of the digital camera detected by the terminal control device or the list of the digital camera which includes the IP address, and a selection device for a terminal equipment to select the IP address or the digital camera displayed on the list, and the terminal control device sends the data for requiring the image data transmission to the digital camera which includes the IP address selected by the selection device for the terminal equipment or the digital camera selected by the selection device for the terminal equipment.

In the system for sending and receiving the image data, when the terminal control device judges that one digital camera which includes the IP address of the digital camera or the IP address is included in the list, the terminal control device automatically sends the data for requiring the image data transmission to the digital camera.

DETAILED DESCRIPTION OF THE PREFERRED EMBODIMENTS

Preferred embodiments of the present invention will be described below referring to the accompanying drawings.

Figure 1:
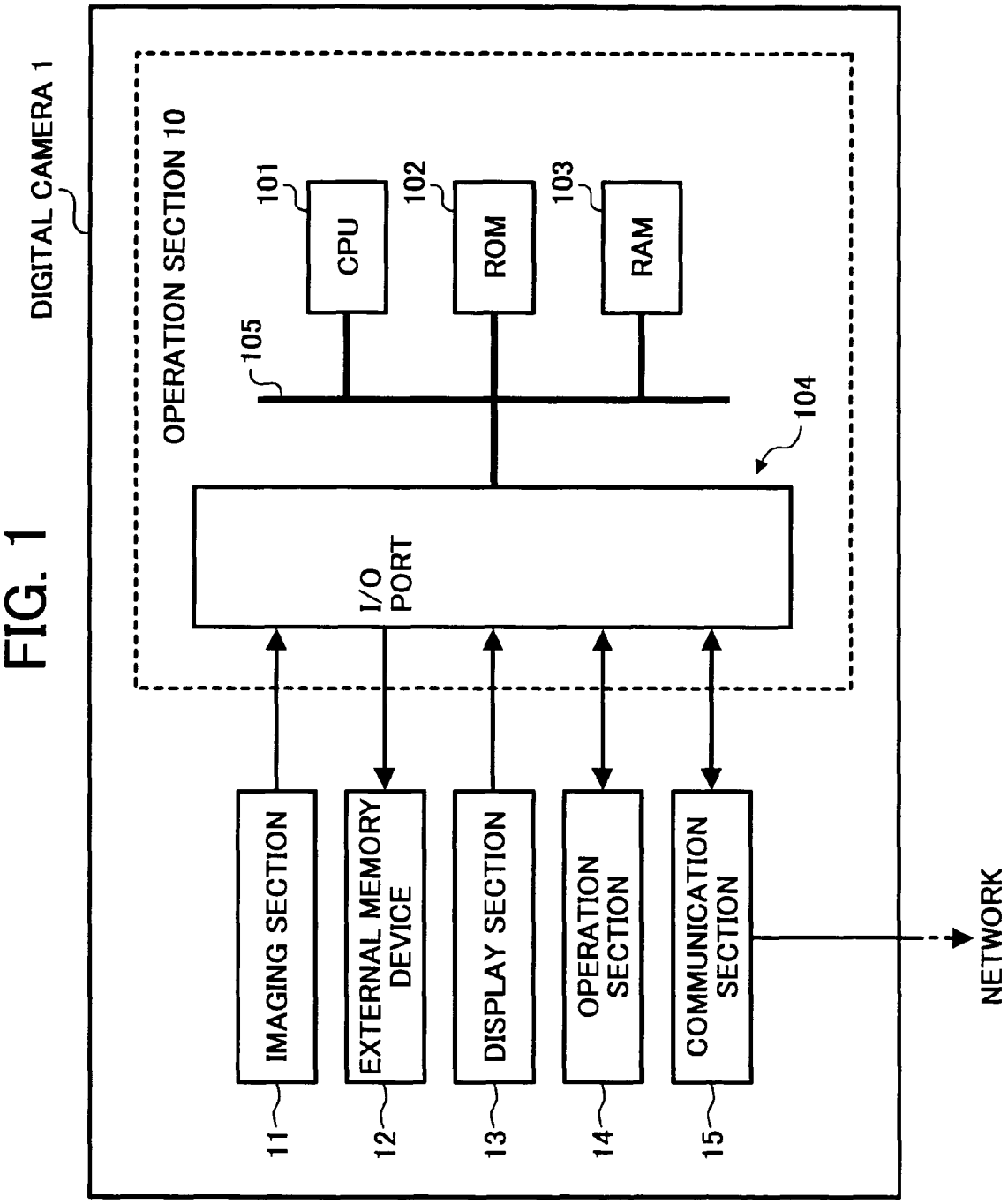
FIG. 1 is a block diagram showing a digital camera of the present invention.

FIG. 1 is a block diagram showing a digital camera of the present invention. The digital camera includes a control section 10 which has a CPU101, an imaging section 11 which conducts imaging, an external memory device 12 which stores image data, a display section 13 which displays an image before imaging by the imaging section 11 or an image after imaging by the imaging section 11 (imaged image) or varied information or the like, an operation section 14 in which varied setting-up, inputting or the like is conducted by a user, and a communicating device 15 which conducts a communication with the other device connected to a local area network (LAN).

In the control section 10, the CPU10 is connected to a ROM 102, a RAM 103, and an I/O port 104 by a bass line 105. The ROM 102 and the ROM 103 store data or the like, which are required for a programming processing for controlling. The CPU 101 carries out varied processing of the digital camera 1 based on the programming processing for controlling.

The imaging section 11 includes a CCD sensor, which has a photodiode and a CCD, and an A/D conductor. The image data (digital data) obtained by the imaging of the imaging section 11 are stored in the external memory device 12. A drive is used as the external memory device 12, which conducts reading and writing with respect to an external memory for example a flush memory or the like.

The display section 13 is disposed in a back side or the like of a body of a digital camera (not shown). In this embodiment a liquid crystal monitor is used as the display section 13. The operation section 14 is also disposed in the body of the digital camera as a console or the like; however, for instance when a liquid crystal screen of a touch-screen type is used for the display section 13, this liquid crystal screen is used as the operation section 14. A communication device 15 has a jack for a cable for example, 100BASE-T, to connect the digital camera 1 with the following network.

Figure 2:
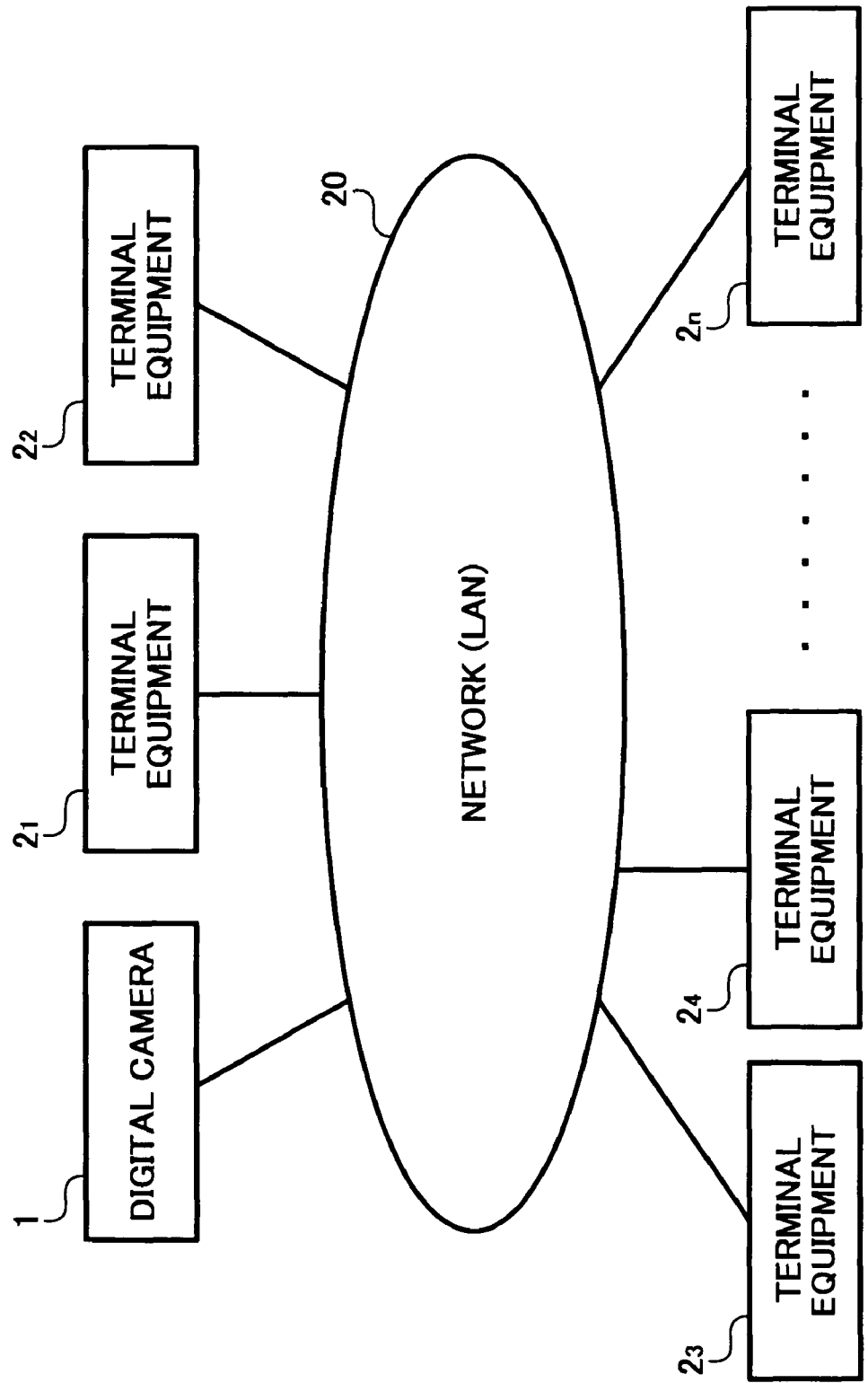
FIG. 2 is a schematic diagram showing an arrangement of a system for sending and receiving image data of the present invention.

FIG. 2 shows a system for sending and receiving image data according to the present invention, and the digital camera 1 is connected to the network (local area network: LAN). In this network 20, the digital camera 1 is connected to this network 20 as needed, and terminal equipment 2 ($2_1$-$2_n$) such as a computer, a PDA or the like is also connected thereto. Terminal equipment which includes a server function is also able to be used as the terminal equipment 2.

Figure 7:
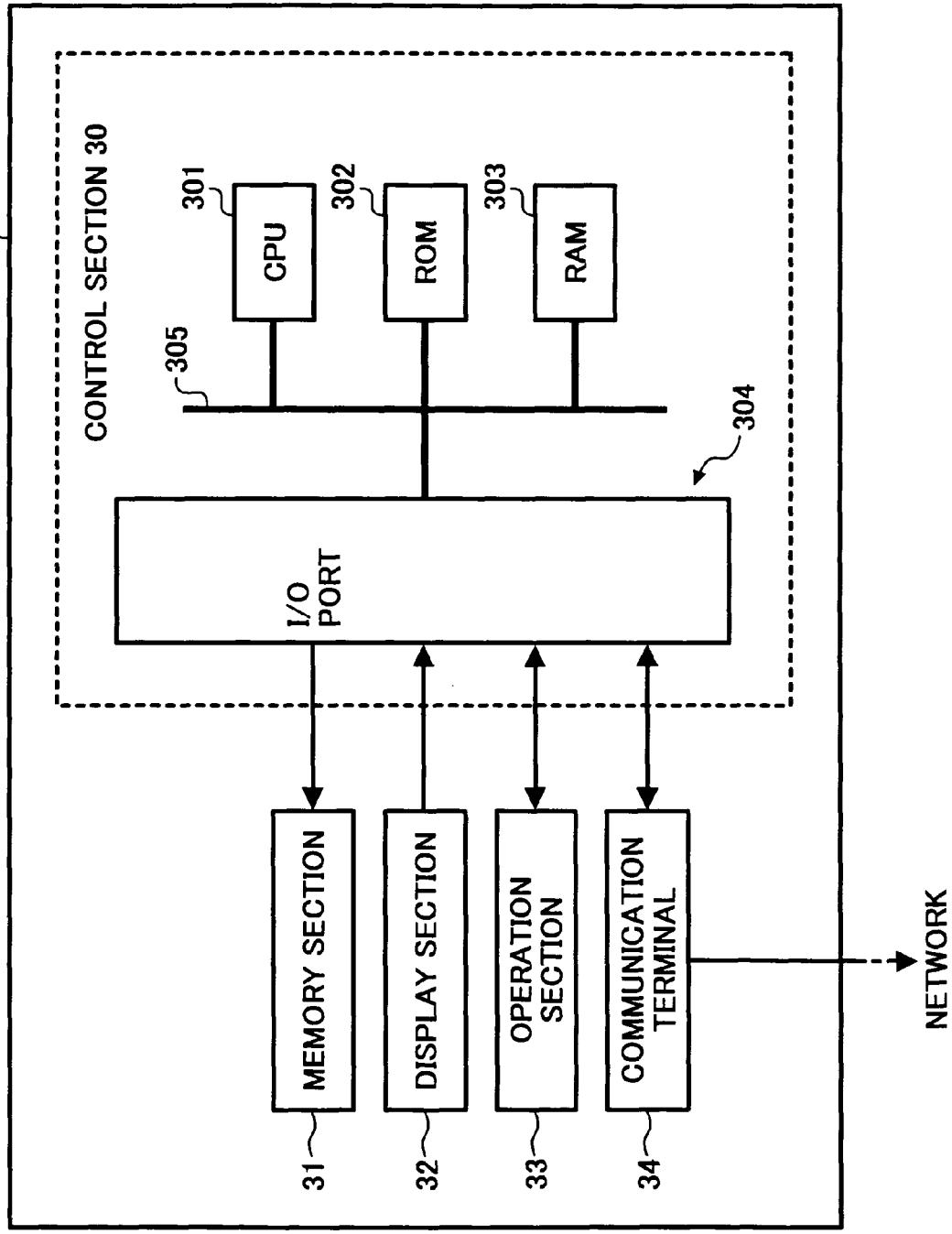
FIG. 7 is a block diagram showing an arrangement of terminal equipment used in a system for sending and receiving image data of the present invention.

FIG. 7 is a block diagram showing an arrangement of the terminal equipment 2. It has the same arrangement as the digital camera shown in FIG. 1. The terminal equipment 2 includes a control section 30, which has a CPU301, a memory section 31, which stores varied data such as image data or the like, a display section 32, which displays the image data or the like stored in the memory section 31, an operation section 33 in which varied operations for setting-up, inputting or the like are conducted by a user, and a communication device 34, which conducts a communication with the other device connected to the network (LAN) 20.

In the control section 30, the CPU 301 is connected to a ROM 302, a RAM 303, and an I/P port 304 by a bass line 305. The ROM 302 and RAM 303 store data or the like which are required for a programming processing for controlling, and the CPU 301 conducts varied processing in the terminal equipment 2 based on the programming for controlling.

When the terminal equipment 2 is a computer, the operation section 33 is a mouse, a keyboard or the like, and when the terminal equipment 2 is a PDA, the operation section 33 is an operation bottom which is disposed in a body of the PDA. When the terminal equipment 2 is the computer, the display section 32 is a liquid crystal display, a CRT display or the like. When the terminal equipment 2 is the PDA, the display section 32 is a liquid crystal monitor which is disposed in the body of the PDA. A touch panel or the like is also used as the operation section 33. The communication device 34 includes a jack for a cable for example, 100BASE-T, to connect the terminal equipment 2 with the network (LAN) 20.

In the following, a method for transmitting image data, which are imaged by the digital camera 1 and are stored in the external memory device 12, and image data, which are stored in the terminal equipment $2_1$, to the terminal equipment $2_2$-$2_n$, which is connected to the network 20 will be explained by the following three systems. (1) A system for sending and receiving image data being conducted in such a manner that the digital camera 1 finds the terminal equipment 2, which receives the transmission of the image data, and sends the image data. (2) A system for sending and receiving image data being conducted in such a manner that the terminal equipment $2_1$ finds the digital camera 1 or the other terminal equipment $2_2$-$2_n$ to require the transmission of the image data, and the image data is sent to the terminal equipment $2_1$. (3) A system for sending and receiving image data being conducted in such a manner that the digital camera 1 informs a condition, which is capable of transmitting the image data, to the terminal equipment $2_2$-$2_n$, and the terminal equipment $2_1$, which receives the information from the digital camera 1, receives the image data from this digital camera 1.

(1) The transmission by the system for sending and receiving the image data in which the digital camera finds the terminal equipment 2 and transmits the image data.

Figure 3:
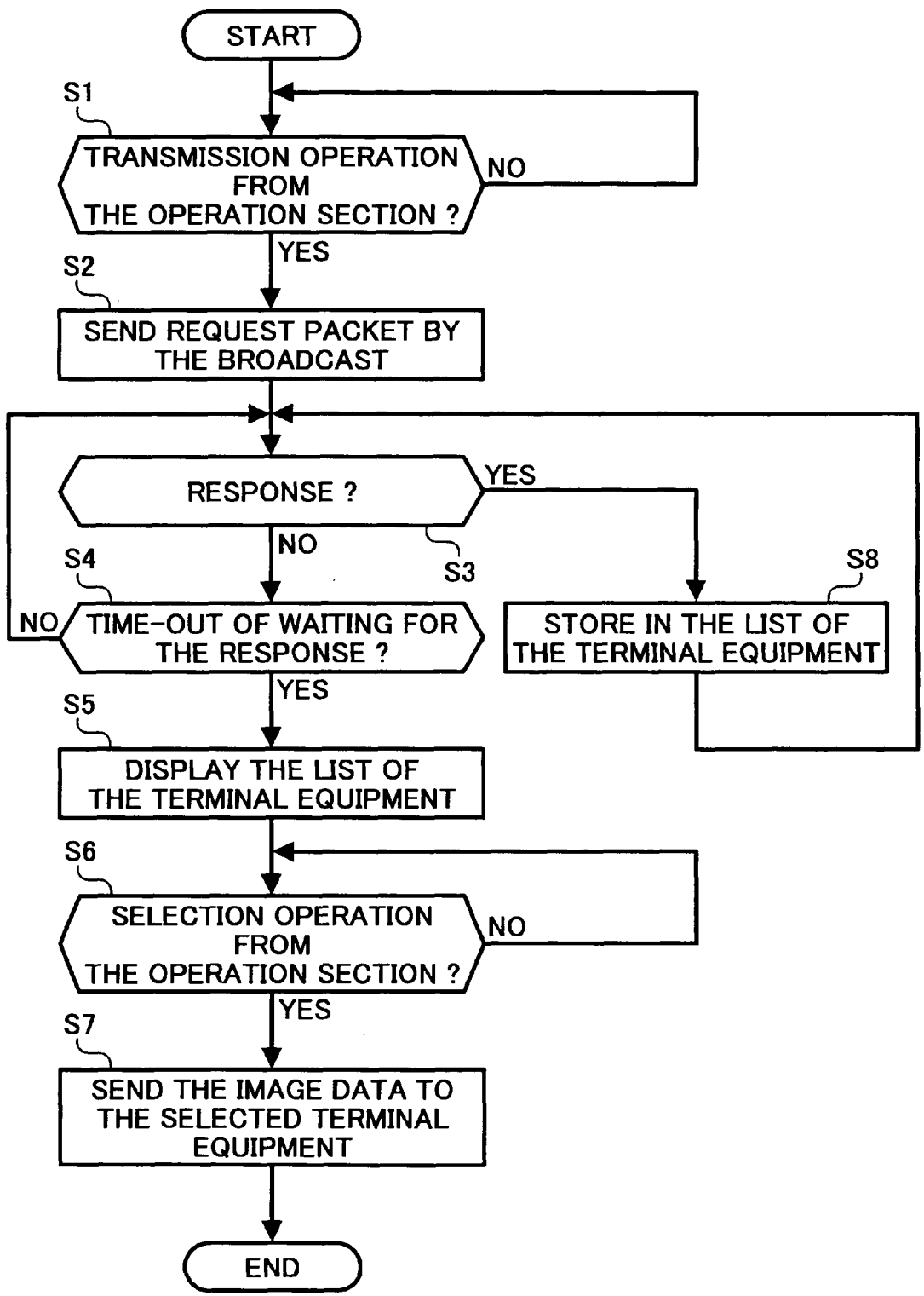
FIG. 3 is a first flow chart showing a processing of a control section in the digital camera of the present invention

In the following, a method in which the digital camera 1 finds the terminal equipment 2 and transmits the image data will be explained referring to the flow charts shown in FIGS. 3 to 6. As shown in FIG. 3, the operation section 14 of the digital camera 1 is operated by a user for sending the image data to the terminal equipment 2, which is connected to the network 20. When a signal for requiring an image transmission is sent to the control section 10 from the operation section 14 (step S1), the control section 10 sends request data (packet for requesting) by a broadcast in order to detect the terminal equipment 2 which is connected to the network (LAN) 20 and is capable of sending and receiving data (step S2). The control section 10 in particular sends the request data as a format of TCP or IP packet to the terminal equipment 21-2n which is connected to the network 20 by the broadcast through the communication device 15. Thereafter, the control section 10 times a period after the request data are sent, and waits for response data which are a response signal with respect to the request data replied from the terminal equipment $2_1$-$2_n$ until a predetermined time is passed (step S3).

The terminal equipment 21-2n, which is connected to the network 20 consistently receives data sent by the broadcast, and is adopted to conduct a program which informs an IP address of own terminal equipment to the terminal equipment in which the data are sent by the broadcast. The terminal equipment 2 in which the request data by the broadcast are received sends the response data, which are the IP address of own terminal equipment or the like, as a format of TCP or IP packet to the digital camera 1.

After the control section is in the condition, which waits for receiving the response data, when the control section 10 receives the response data (when the control section receives the response) through the communication device 15 before the predetermined time is passed (In case of YES in step S3), the control section 10 adds the terminal equipment 2 in which the response data are received into a list of the responded terminal equipment, and stores information such as the IP address of the terminal equipment 2 or the like into RAM 103 (step S8). After that, the control section 10 again waits for receiving the response data from the other terminal equipment 2 (step S3).

When the response data are not received from the terminal equipment 2 (in case of NO in step S3), the control section 10 judges whether or not the predetermined time is passed (time out of waiting for the response) after the request data are sent (step S4). When the predetermined time is not passed (in case of NO in step S4), the control section 10 again waits for receiving the response data (step S3), and when the predetermined time is passed, the control section 10 displays the list of the terminal (terminal list) stored in the RAM 103 on the display section 13 (step S5).

The control section 10 judges whether or not any one of terminal equipment 2 from the list of the terminal equipment displayed on the display section 13 is selected by the operation section 14 (step S6). When the terminal equipment 2 is selected, the control section 10 reads out the image data, which are imaged by the imaging section 11, from the external memory device 12, and sends the image data to the IP address of the selected terminal equipment 2 (step S7). The decision of the operation section 14 is made by a method for selecting the terminal equipment 2 conducted by moving a selection cursor. Furthermore when the touch-screen type is used in the display section, the decision is made by a method for selecting conducted by directly touching the screen.

According to the above-mentioned processing, the respective IP address and the host name of the terminal equipment 2, which is connected to the network 20 are not necessary to be directly inputted from the operation section 14 of the digital camera 1, and the image data are easily and promptly sent to the other terminal equipment which is connected to the network 20.

Figure 4:
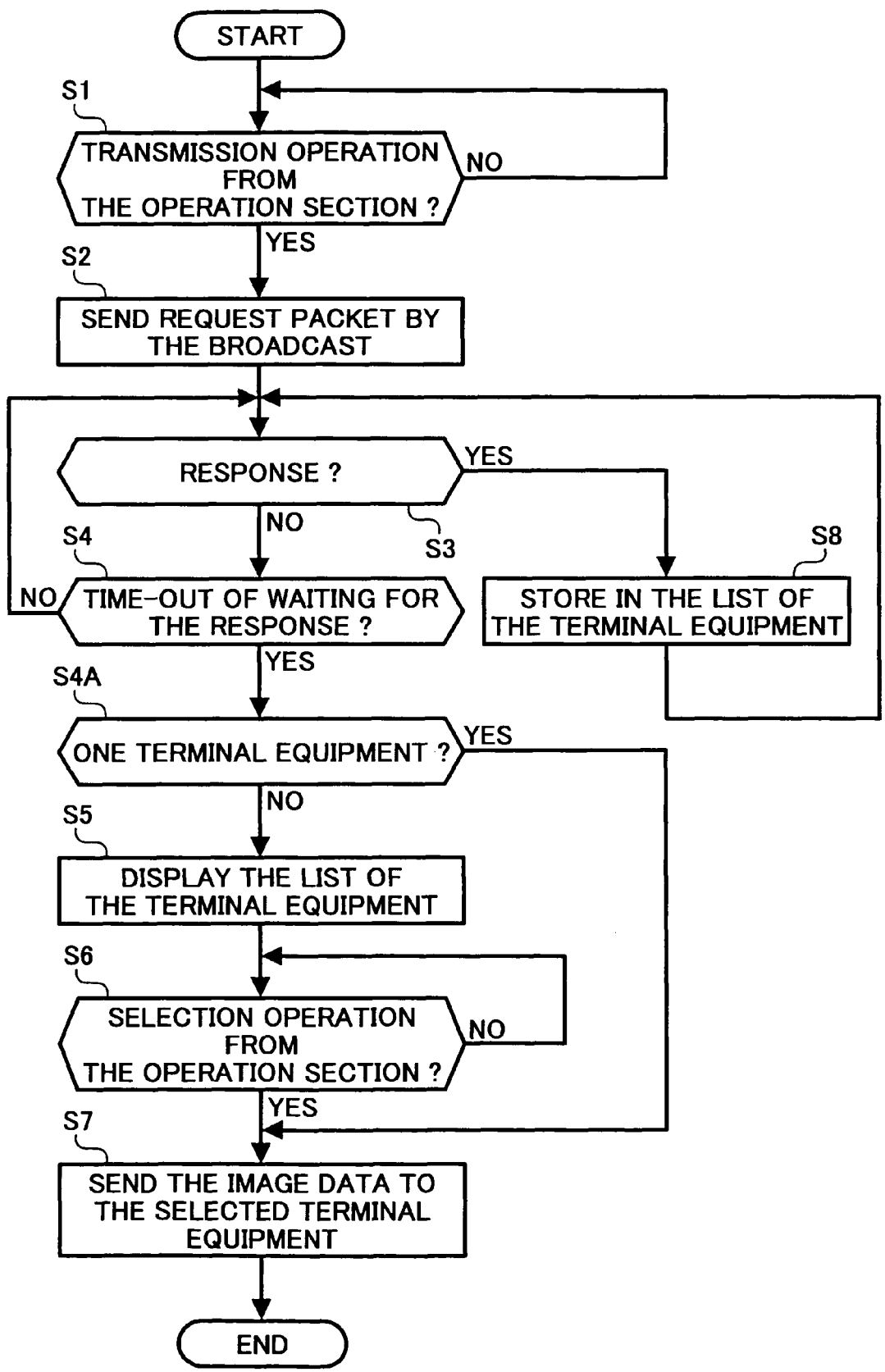
FIG. 4 is a second flow chart showing a processing of a control section in the digital camera of the present invention.

As shown in FIG. 4, according to the processing shown in FIG. 3, the control section 10 waits for the response data during the predetermined time, and when the time of waiting for the response data is passed (in case of YES in step S4), the control section 10 confirms the list of the terminal equipment (terminal equipment list) sorted in the ROM 103 (step S4A). When the only one terminal equipment 2 is stored in the list (in case of YES in step S4A), the processing for displaying the list of the terminal equipment (terminal equipment list) in the display section 13 (step S5) and the processing to judge whether or not any one of terminal equipment 2 displayed on the list of the terminal equipment is selected (step S6) are skipped, so that the control section 10 is adopted to send the image data automatically to the IP address of the terminal equipment, which is stored in the list of the terminal equipment (step S7). When the only one terminal equipment 2 is included in the list, the terminal equipment 2 can be specified without selecting the terminal equipment 2 by the operation section 14, so that the processing for displaying the list of the terminal equipment on the display section 13 (step S5) and the processing for selecting the terminal equipment 2 (step S6) are able to be skipped. By skipping these processing (steps S5 and S6), the processing for sending the image data can be conducted promptly as well as the processing conducted by the operation section 14 can be simplified, so that the complicated operation can be reduced.

When the image data are already sent to any of terminal equipment 2 from the digital camera and, when the IP address or the like of the terminal equipment 2 in which the previous image data are sent is stored in the ROM 103, the terminal equipment 2, which is capable of receiving the image data, is able to be specified without confirming the terminal equipment 2, which is capable of receiving the image data found by sending the request data. Furthermore, the terminal equipment 2 in which the previous image data are sent, has a high possibility to be selected once again by the operation section 14 as the terminal 2 in which the image data are sent. Consequently, the processing for displaying the list of the terminal equipment (terminal equipment list) on the display section 13 (step S5) and the processing for selecting the terminal equipment 2 (step S6) are skipped so as to conduct the processing for sending the image data automatically to the terminal equipment 2 in which the previous image data are sent.

Figure 5:
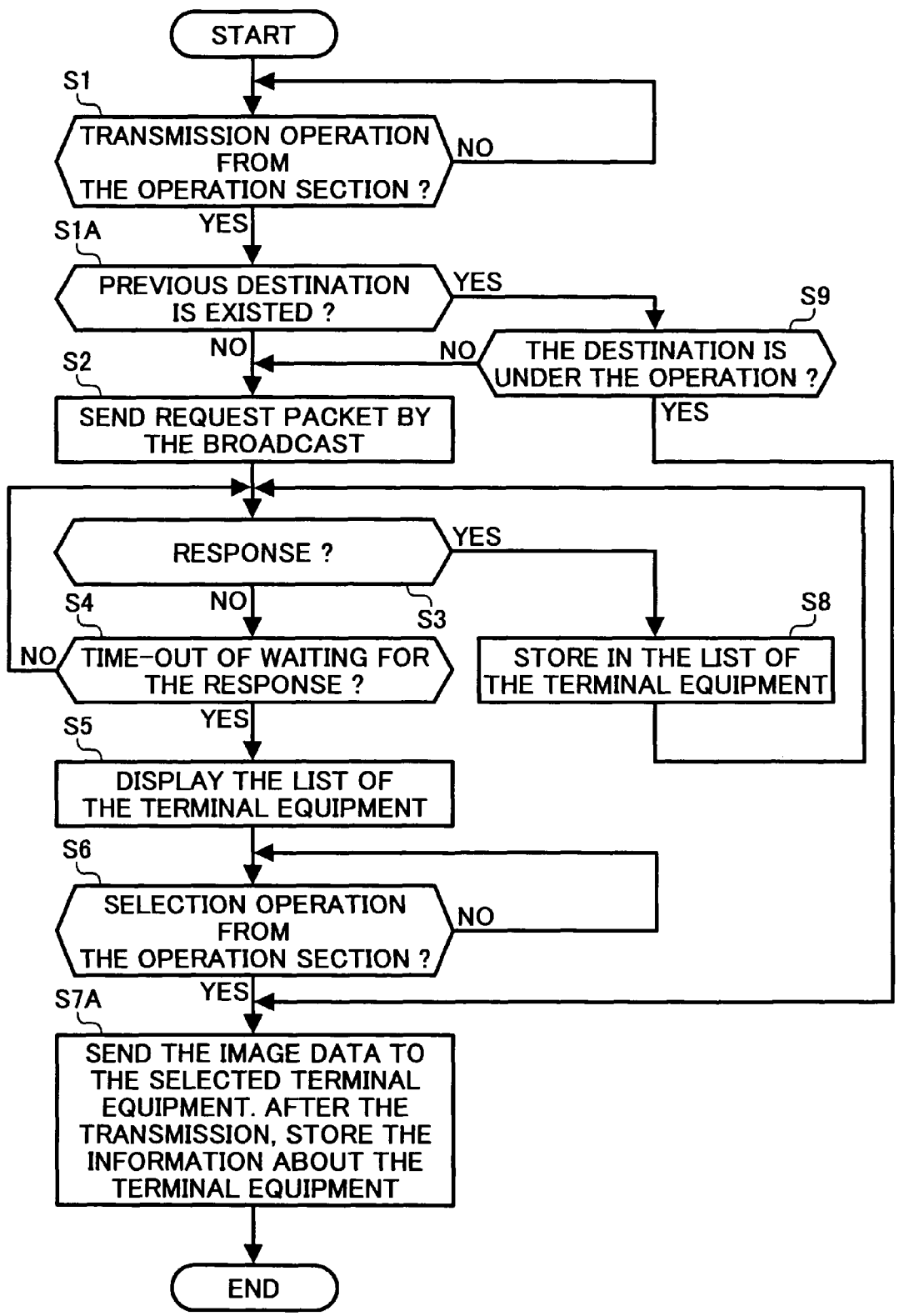
FIG. 5 is a third flow chart showing a processing of a control section in the digital camera of the present invention.

FIG. 5 is the flow chart showing the above-mentioned processing. When the control section 10 receives the signal for requiring the image transmission by the operation of the operation section 14 (step S1), the control section 10 finds whether or not the terminal equipment 2 in which the image data are already sent is stored in the RAM 103 (step S1A).

When the processing for sending the image data is not carried out yet, or when the terminal equipment 2 in which the previous image data are sent is not stored in the RAM 103 (in case of NO in step S1A), the processing is carried out in accordance with the following steps. The request data (the request packet) are sent to the network 20 by the broadcast (step S2), and the processing for receiving the response data is carried out until the time for receiving the response is over (steps S3 and S4), then the process for storing the list of the image receivable terminal equipment 2 in to the RAM 103 is carried out (step S8). After the time of waiting for the response is over (in case of YES in step S4), the control section 10 displays the list of the image data receivable terminal equipment 2 on the display section 13 (step S5). The image data are sent to the terminal equipment 2 selected by the operation section 14 as well as the information about the terminal equipment 2 in which the image data are sent is stored in the RAM 103 (step S7).

When the terminal equipment 2 in which the previous image data are sent is stored in the RAM 103 (in case of YES in step S1A), the request data are sent to the terminal equipment 2, which is stored in the RAM 103. When the control section 10 sends the request data to the terminal equipment 2, the IP address of the terminal equipment 2 which is the destination of the terminal equipment 2 is able to be specified, so that the request data are sent to the terminal equipment 2 by directly designating the IP address without using the broadcast.

When the response data are replied from the terminal equipment 2 of the destination (in case of YES in step S9), it is judged that the terminal equipment 2 is capable of receiving the image data through the network 20 (the terminal equipment 2 is under the operation). In accordance with the judgment, the image data are sent to the terminal equipment 2, and the information (IP address or the like) of the terminal equipment in which the image data are sent is stored in the RAM 103 as the terminal equipment information of the terminal equipment in which the previous image data are sent (step S7A).

When the response data are not replied from the terminal equipment of the destination (in case of NO in step S9), it is judged that the terminal equipment 2 in which the image data are sent in past times is not capable of receiving the image data (the terminal equipment 2 is not under the operation). In accordance with the judgment, the processing for sending the request data by the broadcast (step S2) is carried out and then the processing (the processing after step S3) is conducted.

In accordance with the above-mentioned processing, it is judged that the terminal equipment in which the previous image data are sent is still capable of receiving the image data. When the terminal equipment is in the image data receivable condition, the processing for displaying the list of the terminal equipment (terminal equipment list) on the display section 13 (step S5) and the processing for selecting the terminal equipment 2 are skipped so as to send the image data automatically to the terminal equipment 2 in which the previous image data are sent. In accordance with the judgment, the processing for sending the image data is able to be conducted promptly as well as the processing conducted by the operation section 14 is simplified, so that the complicated operation is able to be reduced.

Figure 6:
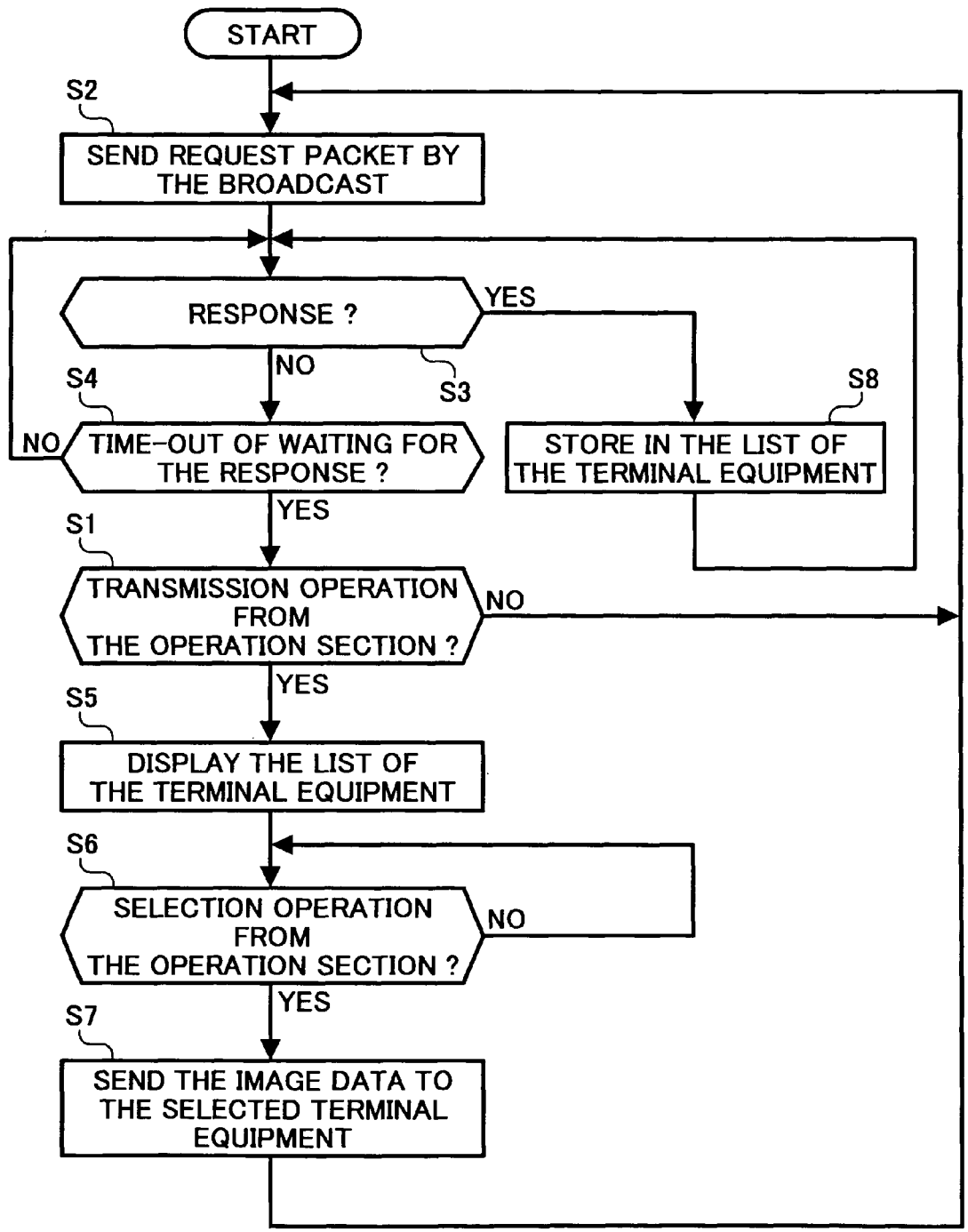
FIG. 6 is a fourth flow chart showing a processing of a control section in the digital camera of the present invention.

As shown in FIG. 6, following processing may be conducted. The following processing is conducted before the control section 10 sends the request data by the broadcast after the signal for requiring the image transmission is received by the operation of the operation section 14. The processing for receiving the response data is carried out until the time of waiting for the response is over (steps S3 and S4). The list of the image data receivable terminal equipment 2 is stored in the RAM 103 (step S8).

By storing the list into the RAM 103 before receiving the signal for requiring the image transmission, when the control section 10 receives the signal for requiring the image transmission by the operation of the operation section 14 (in case of YES in step S1), the control section 10 can display the list stored in the ROM 103 immediately (step S5). In accordance with the processing, the time of the processing for sending the request data or the like by the broadcast can be reduced and the terminal equipment 2 is selected quickly from the list of the terminal equipment displayed on the display section 13 (step S6), so that the image data are able to be sent promptly (step S7).

(2) A transmission by the system for sending and receiving the image data being conducted in such a manner that the terminal equipment $2_1$ finds the digital camera or the other terminal equipment $2_2$-$2_n$, which is connected to the network 20, to require the transmission of the image data.

Figure 8:
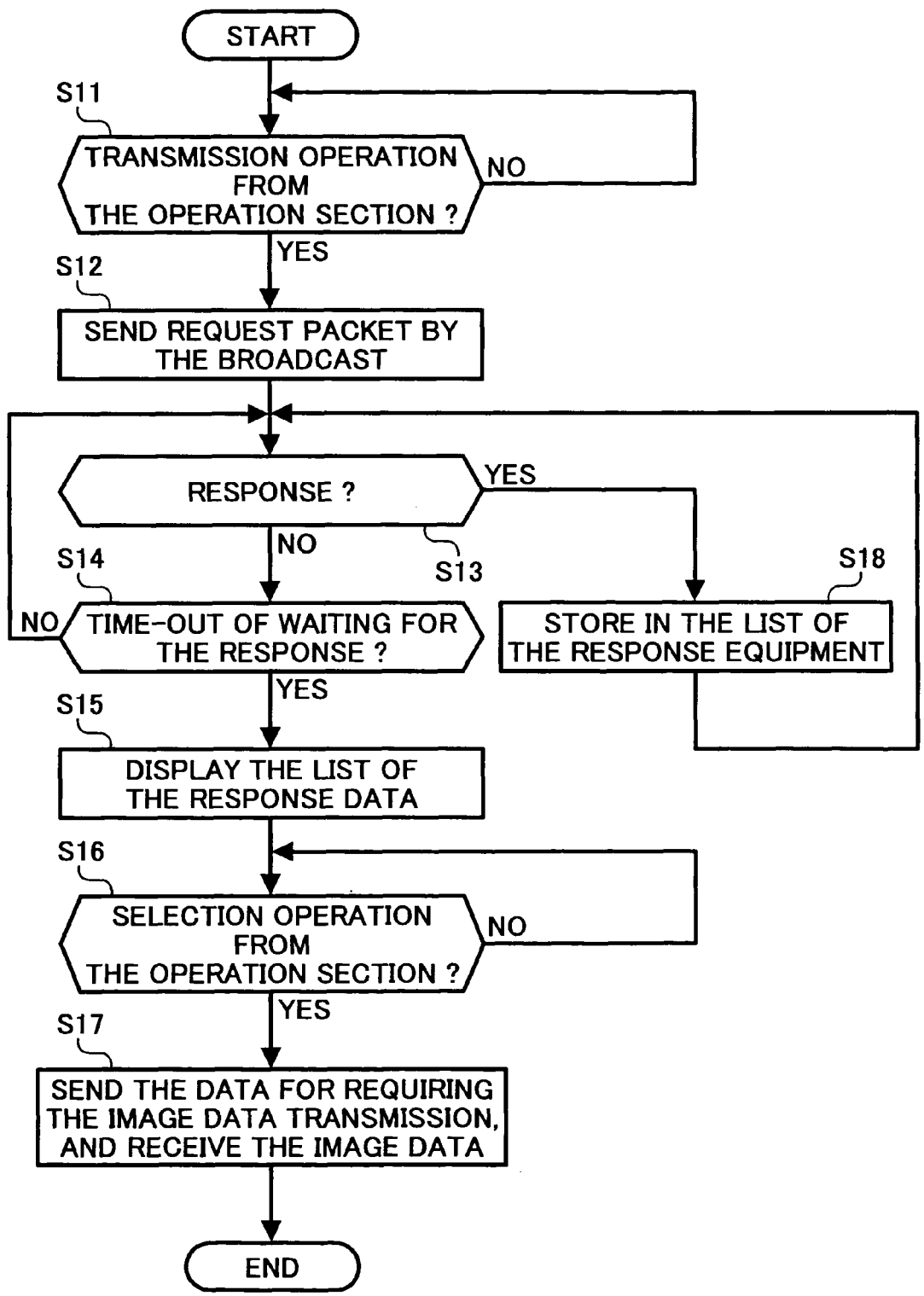
FIG. 8 is a first flow chart showing a processing of a control section in terminal equipment.

Below, a case that the terminal equipment 21 finds the digital camera 1 or the other terminal equipment $2_2$-$2_n$ to require the sending of the image data will be explained with reference to the flow charts shown in FIGS. 8 to 11. As shown in FIG. 8, the operation section 33 of the terminal equipment 21 is operated by a user in order to send the image data to the digital camera 1 or the terminal equipment $2_2$-$2_n$ which is connected to the network 20. When the signal for requiring the image transmission is transmitted to the control section 30 from the operation section 33 (step S11), the control section 30 sends the request data (packet for the request) in order to detect the digital camera 1 and the terminal equipment $2_2$-$2_n$ which are capable of sending and receiving data connected to the network (LAN) 20 (step S12). The control section 30, in particular, sends the request data as the format of TCP and IP packet by the broadcast through the communication device 34 to the digital camera 1 and the terminal equipment $2_2$-$2_n$, which are connected to the network 20. Thereafter, the control section 30 times a period after sending the request data, and waits for the response data, which is also the response signal to the request data, to be responded from the digital camera 1 and the terminal equipment $2_2$-$2_n$ until the predefined time is passed (step S13).

The digital camera 1 and the terminal equipment 22-2n, which are connected to the network 20, constantly receive data sent by the broadcast as mentioned above, and are adopted to conduct a program which informs the IP address of own terminal equipment to the device in which the data are sent by the broadcast. The digital camera 1 and the terminal equipment 22-2n in which the request data are received send the response data, which are also the data of own IP address or the like, as the TCP and IP packet to the terminal equipment 21 in accordance with this processing of the program.

After the control section is in the condition, which waits for receiving the response data, when the control section 30 receives the response data through the communication device 34 (when the control section receives the response) before the predetermined time is over (in case of YES in step S13), the control section adds the terminal equipment $2_2$-$2_n$ and digital camera 1 in which the response data are sent, into the list of the responded device, and then stores the information of the IP address or the like into the RAM 303 (step S18). After that the control section 30 again waits for the response data from the other terminal equipment $2_2$-$2_n$ and the digital camera 1 (step S13).

When the response data are not received from the terminal equipment $2_2$-$2_n$ and the digital camera 1 (in case of NO in step S13), the control section 30 judges whether or not the predetermined time is passed (timeout of waiting for the response) after the request data are sent (step S14). When the predetermined time is not passed (in case of NO in step S13), the control section 30 again waits for receiving the response data (step S13). When the predetermined time is passed, the list (the list of the responded device) which is stored in the RAM 303 is displayed on the display section 32 (step S15).

The control section 30 judges whether or not any one of equipment in the list of the equipment displayed on the display section 32 is selected by the operation section 33 (step S16). When the equipment is selected, the control section 30 sends the data for requiring the image data transmission are sent to the IP address of the selected equipment, and the image data, which are replied in accordance with these data for requiring the image data transmission are received (step S17). The decision by the operation section 33 is made by a method for selecting the equipment conducted by moving a selection cursor. Furthermore when the touch-screen type is used in the display section 32, the decision is made by a method for selecting the equipment conducted by directly touching the screen.

In the system for sending and receiving the image data according to the present invention, by carrying out the above-mentioned processing, each of the IP address or the host name of the digital camera 1 and the terminal equipment $2_2$-$2_n$ is not necessary to be inputted directly from the operation section 33. Consequently, by selecting the specific device from the list of the device displayed on the display section 32, the image data can be received easily and swiftly from the other terminal equipment $2_2$-$2_n$ and the digital camera 1, which are connected to the network 20.

Figure 9:
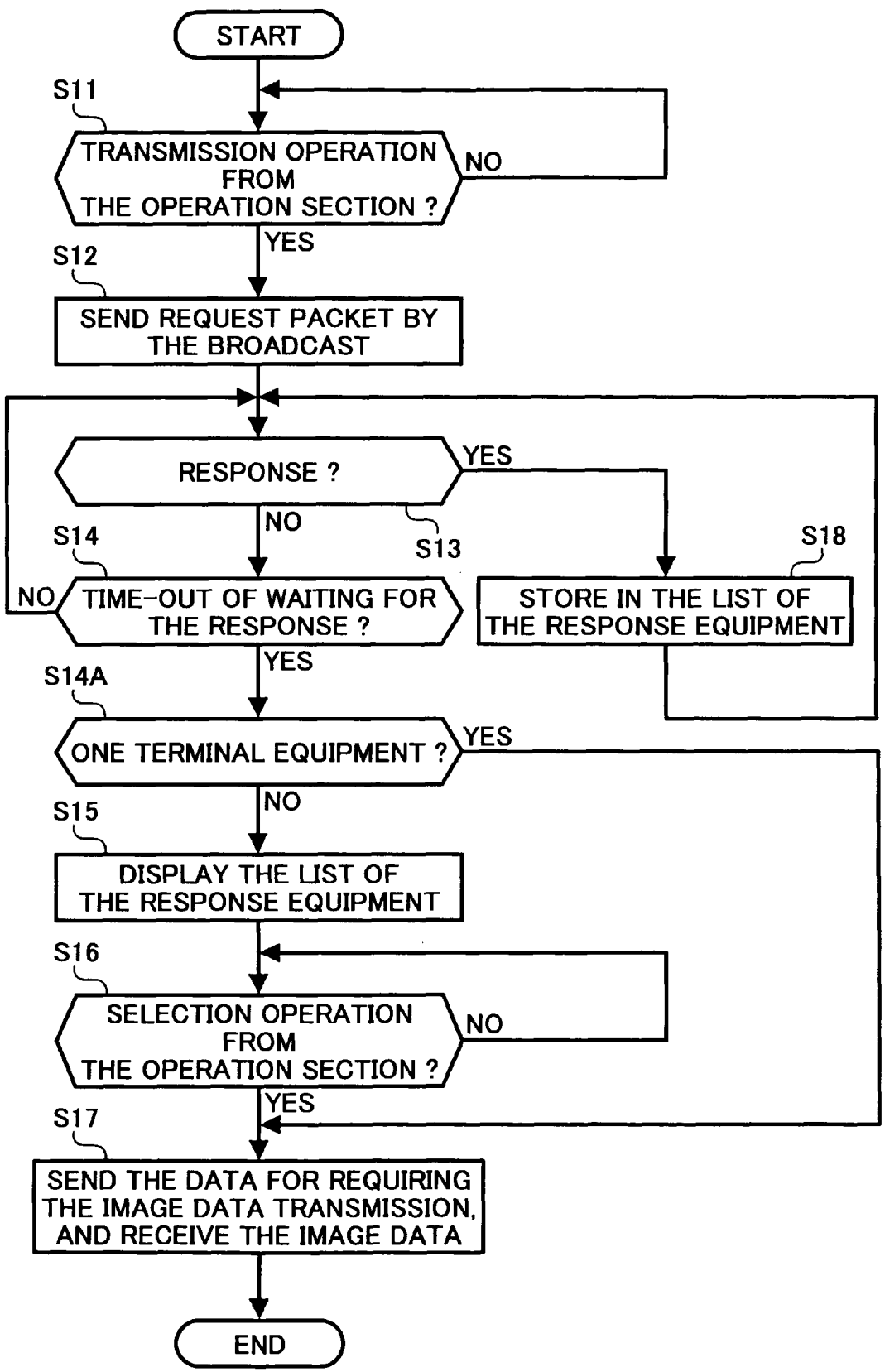
FIG. 9 is a second flow chart showing a processing of a control section in terminal equipment.

As the flow chart shown in FIG. 9, according to the processing shown in FIG. 8, the control section 30 waits for the response data during the predetermined time. When the time of waiting for the response is over, the control section 30 confirms the list of the device stored in the ROM 303 (step S14A). When the only one terminal equipment $2_2$-$2_n$ or the only one digital camera 1 is included in the list (in case of YES in step S14), the processing for displaying the list of the device on the display section 32 (step S15) and the processing to judge whether or not any one of the devices in the list of the device displayed on the display section 32 is selected (step S16) are skipped. Therefore the control section 30 can be adopted to receive the image data by sending the data for requiring the image data transmission automatically to the IP address of the device, which is stored in the list of the responded device (step S17). When the only one equipment sends the response, the destination of the data for requiring the image data transmission is specified without conducting the selection of the equipment by the operation section 33, so that the processing for displaying the list of the responded equipment on the display section 32 (step S15) and the processing for selecting the equipment (step S16) are not required to be carried out. By skipping these two processing (steps S15 and S16), the processing for receiving the image data can be conducted promptly as well as the processing by the operation section 33 can be simplified, so that the complicated operation can be reduced.

When the image data are already received by the terminal equipment $2_1$ from any of the digital camera 1 or the terminal equipment $2_2$-$2_n$, and the IP address or the like of the digital camera or the terminal equipment in which the previous image data are received is stored in the RAM 303, the digital camera 1 or the terminal equipment $2_2$-$2_n$ which is capable of receiving the image data can be specified without confirming the digital camera 1 or the terminal equipment $2_2$-$2_n$, which is capable of sending the image data, found by sending the request data by the broadcast again. Furthermore, the digital camera 1 or the terminal equipment $2_2$-$2_n$ in which the previous image data are received has the high possibility to be selected again by the operation section 33 as the device for receiving the image data. Consequently, the processing for displaying the list of the equipment on the display section 32 (step S15) and the processing for selecting the equipment (step S16) are able to be skipped so as to conduct the processing for sending the data for requiring the image data transmission automatically to the IP address in which the previous image data are received.

Figure 10:
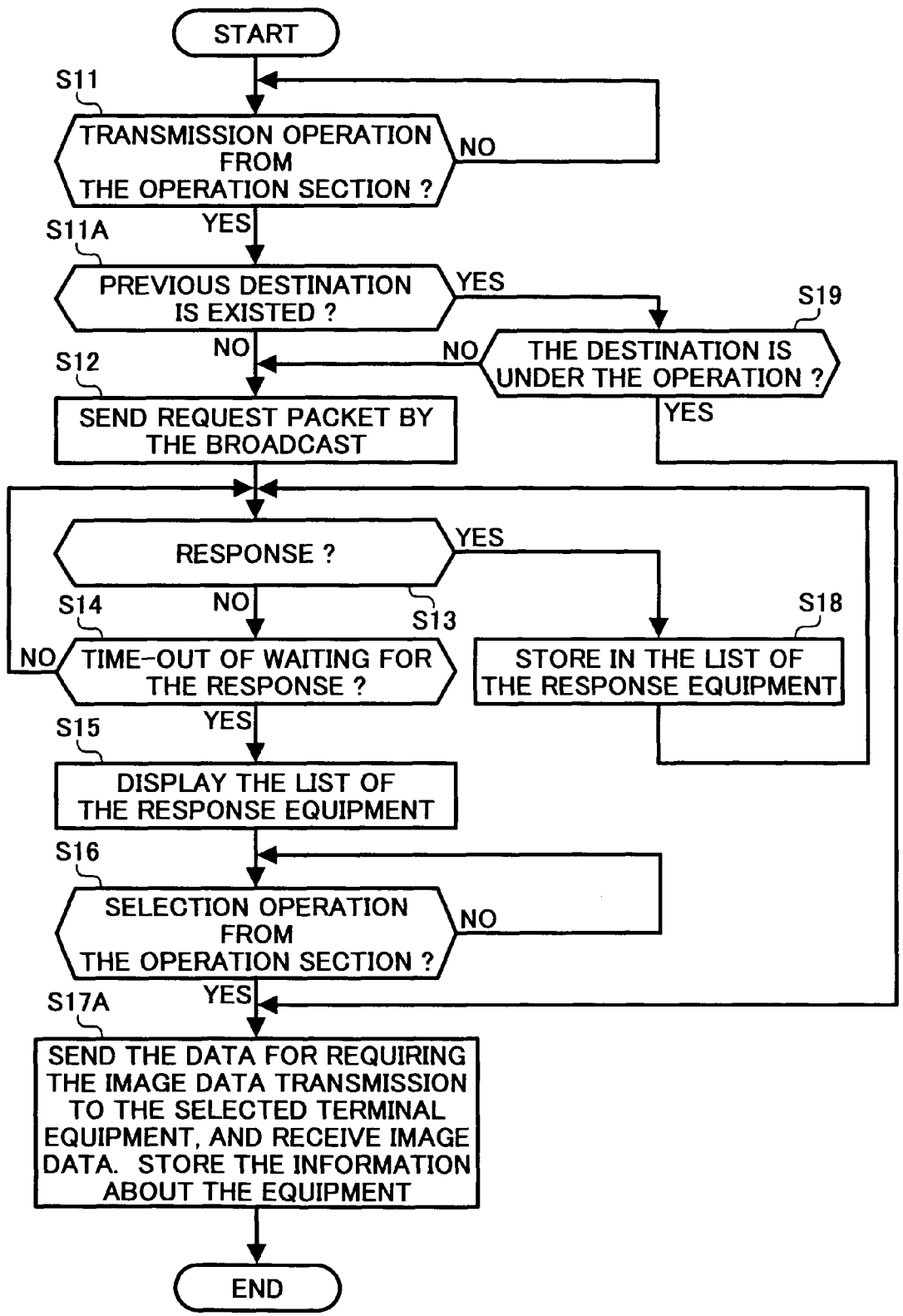
FIG. 10 is a third flow chart showing a processing of a control section in terminal equipment.

FIG. 10 is the flow chart showing the above-mentioned processing. When the control section 30 receives the signal for requiring the image transmission by the operation of the operation section 33 (step S11), the control section 30 finds the device in which the previous image data are already received in the RAM 303 (step S11A). When the processing for receiving the image data is not conducted yet, or the equipment in which the previous image data are sent is not stored in the RAM 303 (in case of NO in step S11A), the request data (the request packet) are sent to the network 20 by the broadcast (step S12). Thereby the control section 30 waits for receiving the response data until the time of waiting for the response is over (steps S13 and S14), and conducts the processing for storing the list of the terminal equipment 22-2n or the digital camera 1, which is capable of receiving the image data, in the RAM 303 (step S18). After the time of waiting for the response is over (in case of YES in step S14), the control section 30 displays the list of the image data receivable equipment on the display section 32 (step S15). The control section 30 sends the data for requiring the image data transmission to the equipment selected by the operation section 33 as well as the control section 30 stores the information about the equipment in which the image data are replied in accordance with the data for requiring the image data transmission in the RAM 303 (step S17).

When the terminal equipment $2_2$-$2_n$ or the digital camera 1 in which the previous image data are received is stored in the RAM 303 (in case of YES in step S11A), the control section 30 sends the request data to the equipment, which is stored in the RAM 303. When the control section 30 sends the request data to the equipment, the IP address of the equipment, which is the destination of the equipment, can be specified so that the IP address is directly designated without using the broadcast so as to send the request data.

When the response data are sent from the designation of the equipment (in case of YES in step S19), it is judged that the terminal equipment 2 can send the data for requiring the image data transmission through the network 20 (the device is on), and the terminal equipment 2 sends the data for requiring the image data transmission to the responded equipment. The information (IP address or the like) of the equipment in which the data are sent is stored in the RAM 303 as the information of the equipment in which the previous data for requiring the image data transmission are sent (step S17A).

When the reply of the response data is not replied from the equipment of the destination (in case of NO in step S19), it is judged that the equipment in which the image data are received in past times is not in the condition which is capable of receiving the data for requiring the image data transmission (the device is not on), so that the processing for sending the request data by the broad cast is carried out (step S12) and then the processing (the processing after step S3) is conducted.

In accordance with the above-mentioned processing, it is judged that the equipment in which the previous image data are sent is still capable of sending the image data. When the device is able to send the image data, the processing for displaying the list of the device (the list of the responded device) on the display section 32 (step S15) and the processing for selecting the equipment (step S16) are skipped so as to send the data for requiring the image data transmission automatically to the equipment in which the previous image data are received. In accordance with the judgment, the processing for sending and receiving the image data is able to be carried out promptly as well as the processing by the operation section 33 is simplified so that the complicated operation is able to be reduced.

Figure 11:
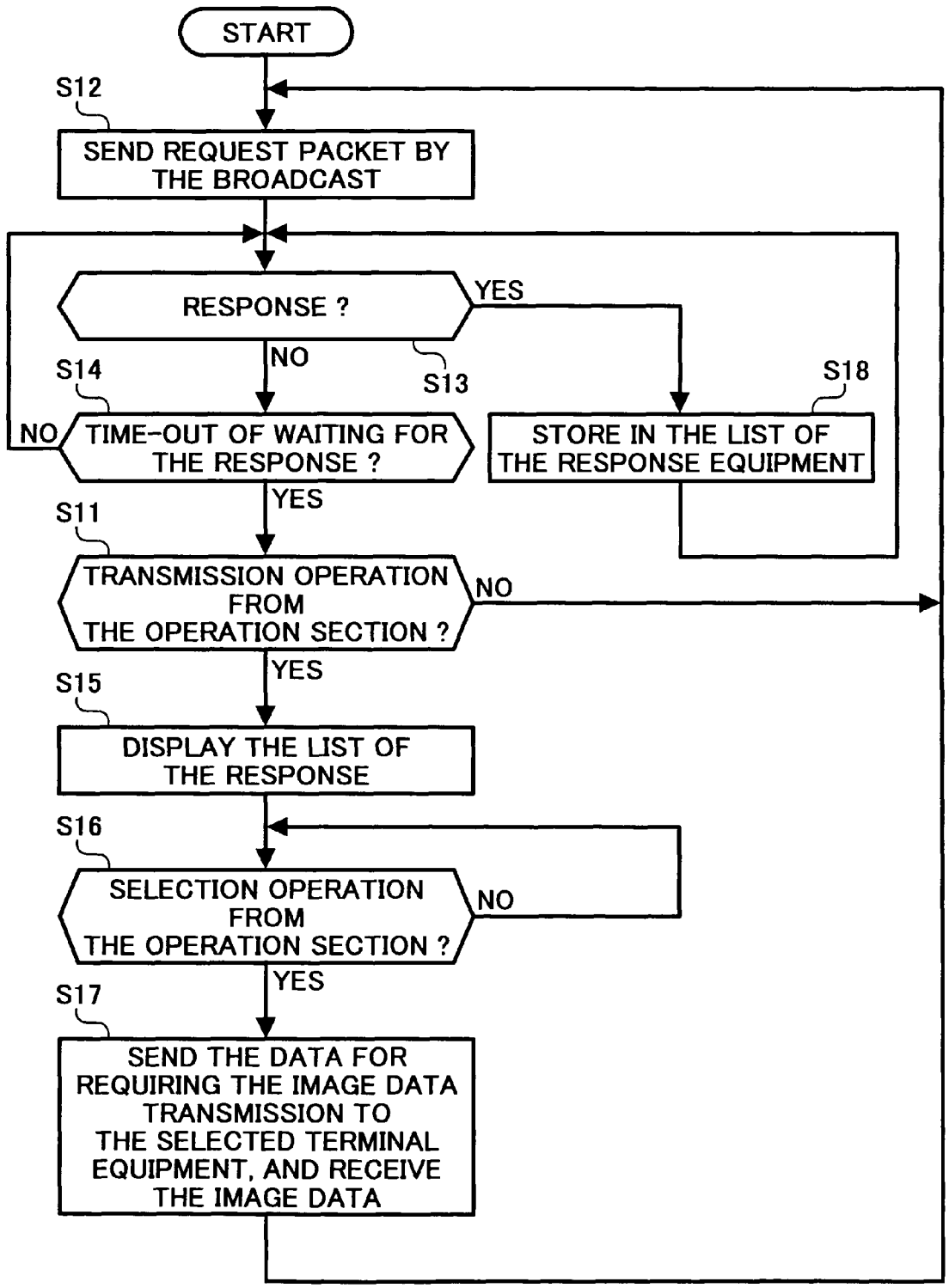
FIG. 11 is a fourth flow chart showing a processing of a control section in terminal equipment.

As shown in FIG. 11, following processing may be conducted. The following processing is conducted before the control section 30 sends the request data by the broadcast after the signal for requiring the image transmission is received by the operation of the operation section 33. The control section 30 sends the request data by the broadcast in advance before receiving the signal for requiring the image transmission (step S12). The processing for receiving the response data is carried out until the time of waiting for the response is over (steps S13 and S14). The list of the image data receivable equipment is able to be stored in the RAM 303 (step S18).

By storing the list in the RAM 303 before receiving the signal for requiring the image transmission, when the control section 30 receives the signal for requiring the image transmission by the operation of the operation section 33 (in case of YES in step S11), the list which is stored in the RAM 303 is able to be displayed on the display section 32 immediately (step S15). Consequently, the time of the processing for sending the request data or the like by the broadcast can be reduced, then the terminal equipment can be selected (step S16) quickly from the list of the terminal equipment, which is displayed on the display section 32 (step S16) and image data are able to be received promptly (step S17).

(3) The transmission of the system for sending and receiving the image data being conducted in such a manner that the digital camera 1 informs a condition, which is capable of transmitting the image data, to the other terminal equipment $2_2$-$2_n$, and the terminal equipment $2_1$, which receives the information from the digital camera 1, receives the image data from this digital camera 1.

In the following, the method in which the digital camera 1 transmits the image data to the terminal equipment 2 will be explained referring to the flow charts shown in FIGS. 12 to 15. When the digital camera 1 is connected to the network 20 in order to send the image data to the terminal equipment 2 which is connected to the network 20, or when the signal for requiring the image transmission is transmitted from the operation section 14 to the control section 10 by the user's operation of the operation section 14 of the digital camera 1 which is connected to the network 20, the control section 10 sends the information data (the packet for information) to the terminal equipment 2, which is connected to the network 20, by the broadcast. In particular, the control section 10 sends the information data which are the IP address or the like of own as the format of TCP or IP, to the terminal equipment $2_1$-$2_n$ or the other digital camera through the communication device 13 by the broadcast.

Figure 12:
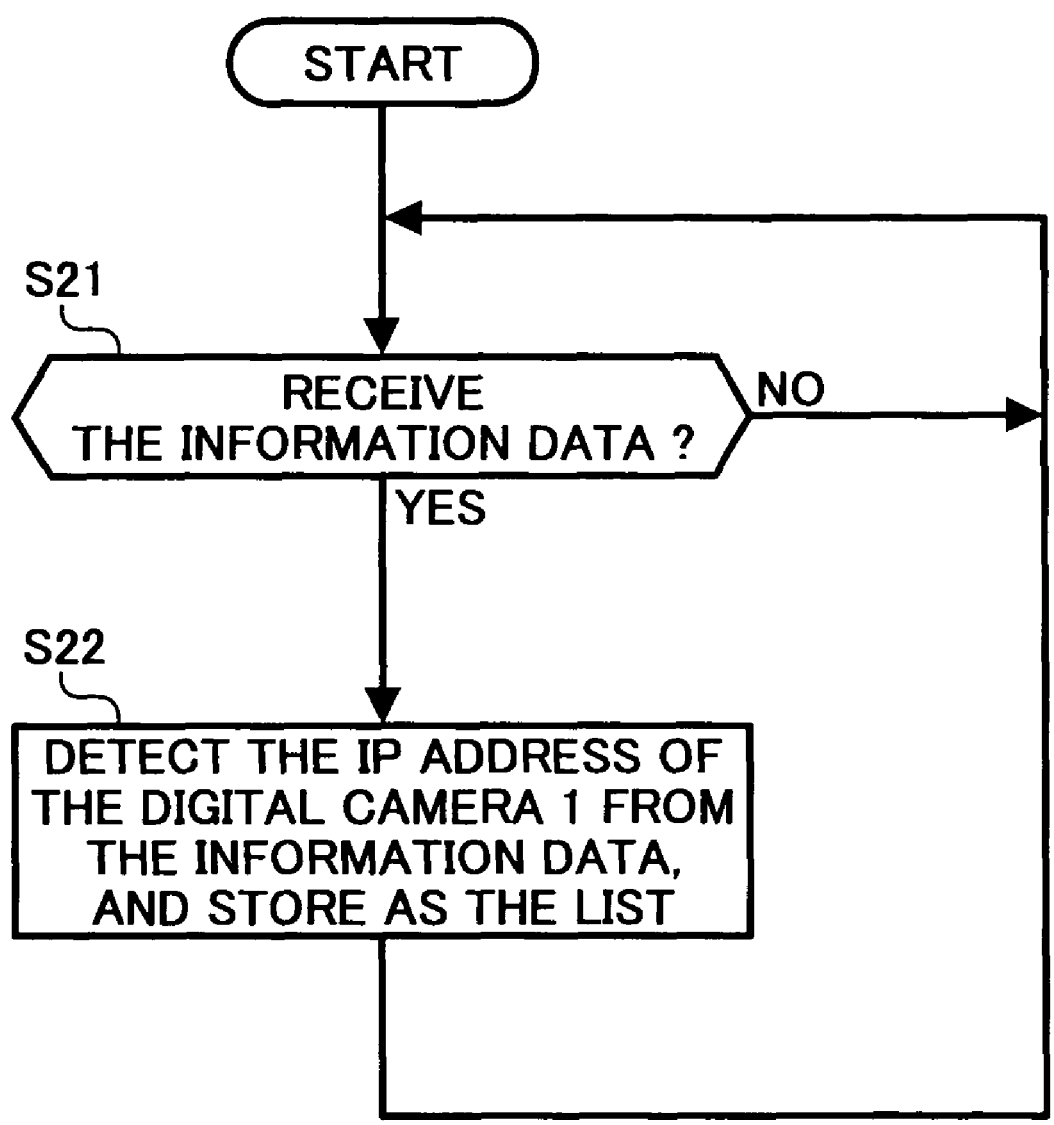
FIG. 12 is a first flow chart showing a processing of waiting for information data in terminal equipment.

As showing in FIG. 12, the control section 30 of the terminal equipment $2_1$, which is connected to the network 20, constantly judges whether or not the information data are received through the network 20 (step S21). When the information data are received, the control section 30 of the terminal equipment $2_1$ detects the IP address of the digital camera 1 from the information data, and stores the information of the IP address or the like in the RAM 303 as the list of the digital camera (digital camera list) in which the information data are received (step S22). Thereafter, the control section 30 repeatedly judges whether or not the information data from the other digital camera are received (step S21).

Figure 13:
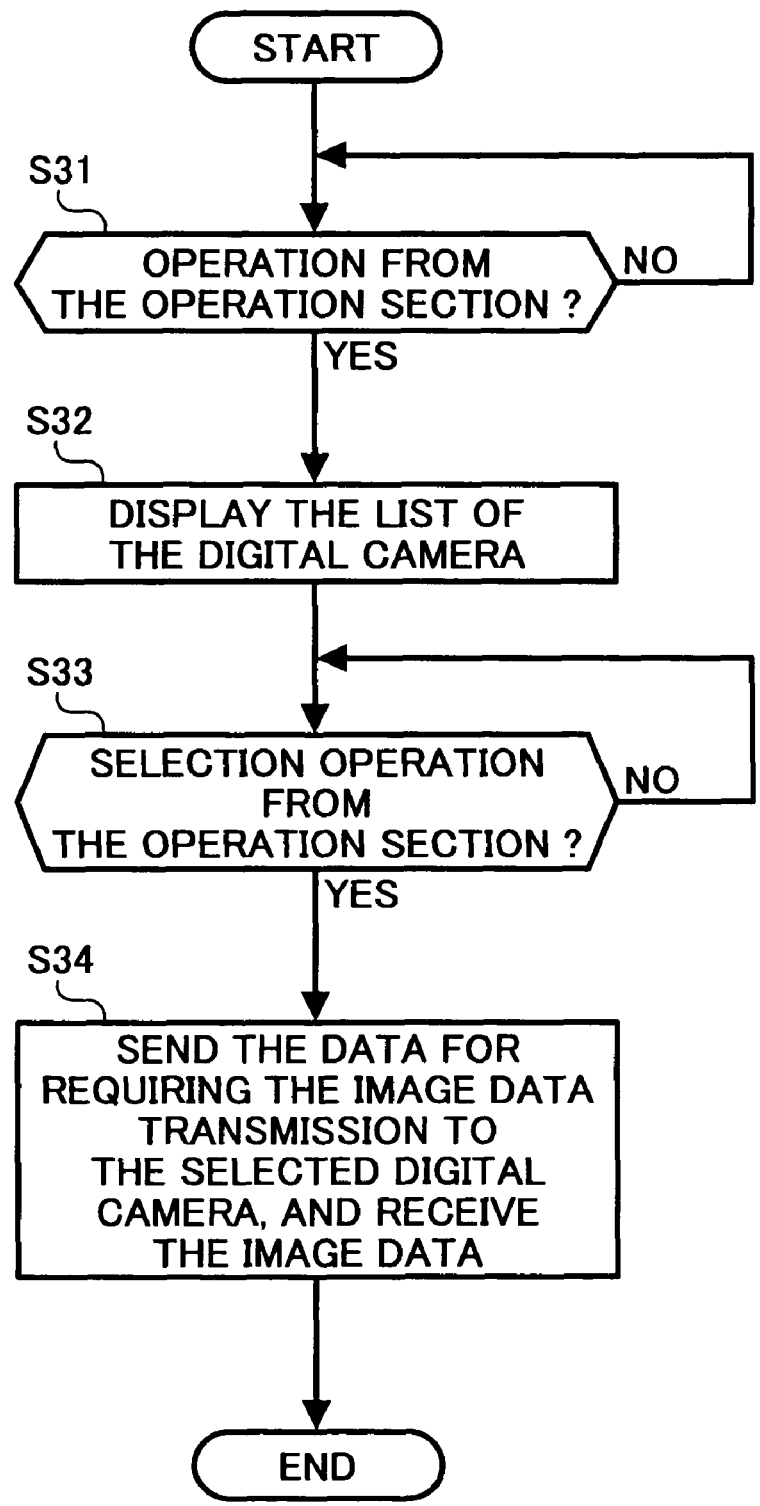
FIG. 13 is a first flow chart showing a processing for an operation judgment of an operation section in terminal equipment.

In addition to the processing to wait for the information data shown in FIG. 12, as showing in FIG. 13, the control section 30 constantly judges whether or not the operation section 33 is operated by the user (step S31). When the operation section 33 is operated by the user, the control section 30 reads out the list of the digital camera, which is stored in the RAM 303, and displays the list on the display section 32 (step S32).

After that, the control section 30 judges whether or not any one of equipment in the list of the digital camera, which is displayed on the display section 32, is selected by the operation section 33 (step S33). When the equipment is selected, the data for requiring the image data transmission are sent to the IP address of the selected equipment, and the control section 30 receives the image data replied in accordance with this data for requiring the image data transmission (step S34). As the above-mentioned, the decision by the operation section 33 is made by the method for selecting conducted by moving the selection cursor in accordance with the operation section 33. Furthermore, when the touch-screen panel is used as the display section 32, the decision is made by the method for selecting conducted by directly touching the screen.

In the system for sending and receiving image data of the present invention, by conducting these processing, the IP address or the host name of the digital camera which is connected to the network 20 is not necessary to be directly inputted from the operation section 33. The image data are received easily and promptly from the digital camera, which is connected to the network 20 by the selecting the specific digital camera from the list of the digital camera displayed on the display section 32. Especially the terminal equipment $2_1$, as the case of (2) the transmission by the system for sending and receiving the image data being conducted in such a manner that the terminal equipment $2_1$ finds the digital camera 1 or the other terminal equipment $2_2$-$2_n$, which is connected to the network 20, to require the transmission of the image data, the list of the digital camera is formed only by the information data without conducting the processing such as the sending the request data and receiving the replay of the response data with respect to the sending of the request data. The data for requiring the image data transmission are sent based on the list of the digital camera, so as to receive the image data of the digital camera 1. Therefore, the image data can be received promptly.

Figure 14:
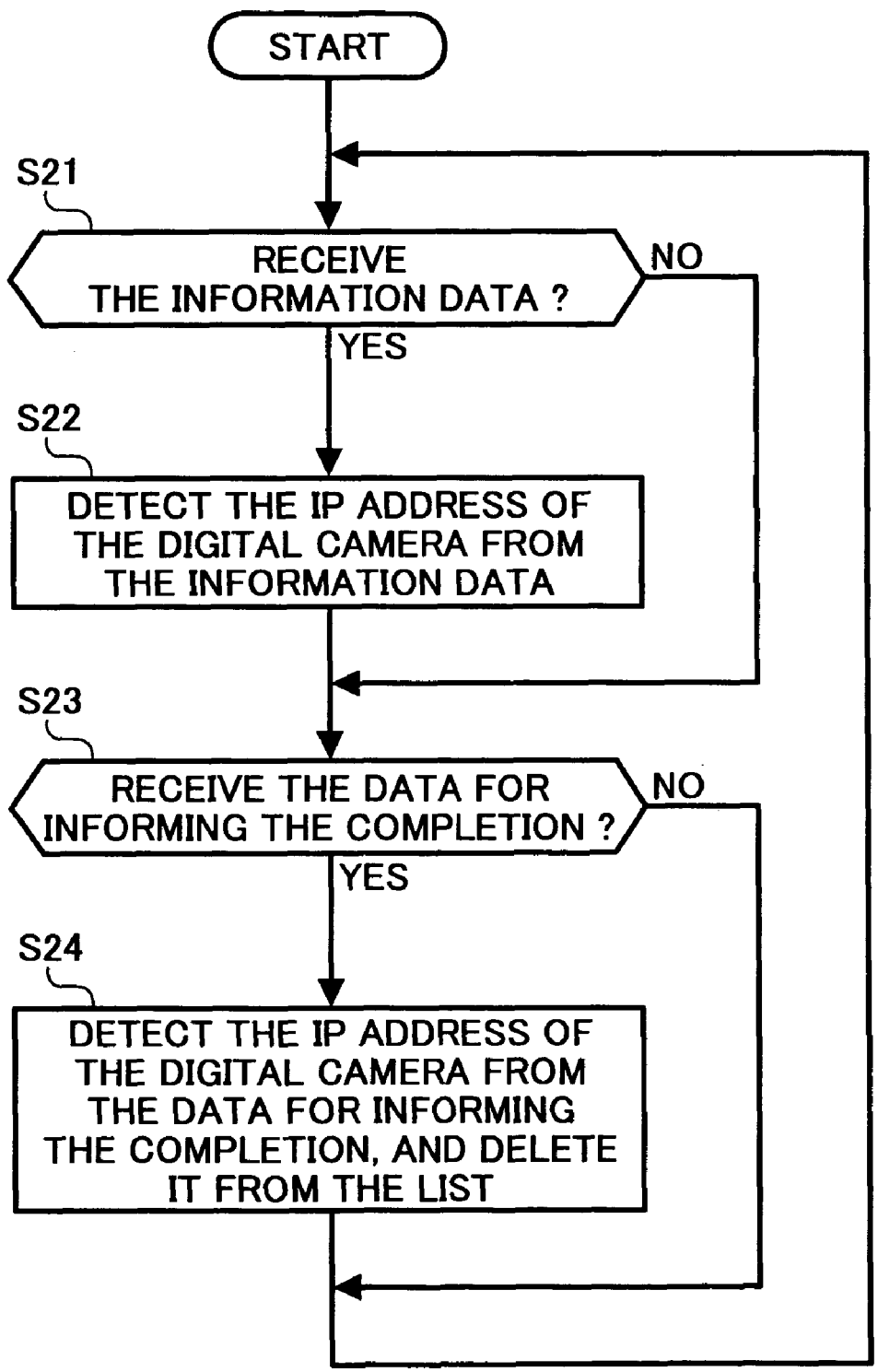
FIG. 14 is a second flow chart showing a processing of waiting for information data in terminal equipment.

In the processing to wait for the information data shown in FIG. 12, the control section 30 constantly observes the connection condition of the digital camera 1 in which the information data are received. When the power of the digital camera 1 in which the information data are received is turned off, or when the connection to the network 20 is disconnected, the digital camera 1 can be deleted from the list of the digital camera. As shown in FIG. 14, the connection condition of the digital camera can be informed to the terminal equipment $2_1$ by sending the data for informing of the completion of the communication to the terminal equipment $2_1$. As the above-mentioned, the control section 30 judges whether or not the data for informing the completion are received from the digital camera (step S23). When the control section receives the data for informing the completion, the control section deletes the name or the IP address of the digital camera, which is disconnected, from the list of the digital camera (step S24) so as to display the latest list of the digital camera on the display section 32 constantly.

Figure 15:
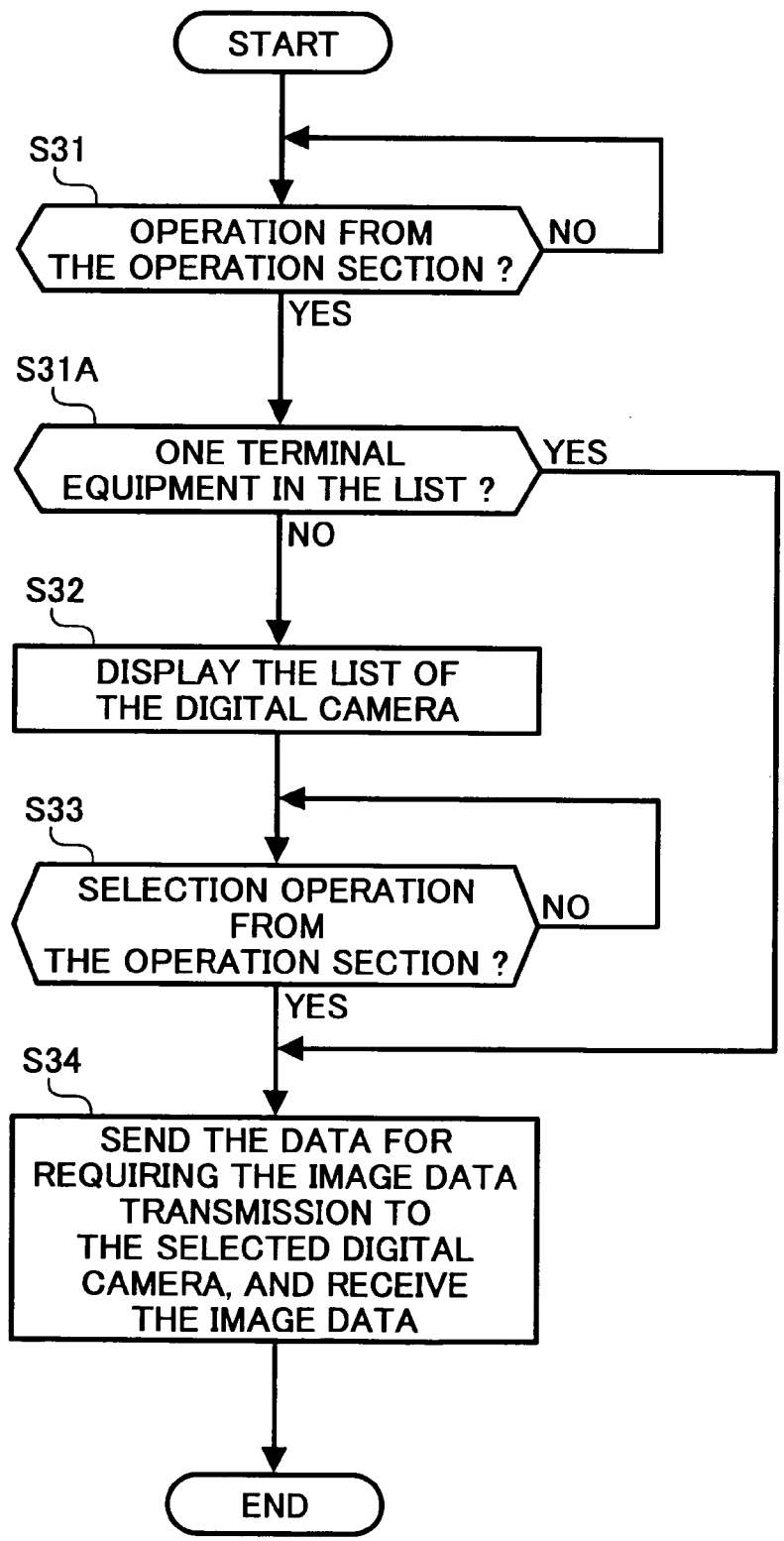
FIG. 15 is a second flow chart showing a processing for an operation judgment of an operation section in terminal equipment.

As shown in FIG. 15, when the operation section 33 is judged to be operated by the judgement whether or not the operation section 33 shown in FIG. 13 is operated (step S31), it is judged whether or not the only one digital camera is stored as the list of the digital camera stored in the RAM 303 (step S31A). When it is judged that the only one digital camera is stored in the RAM 303, the processing for displaying the list on the display section 32 by reading out the list of the digital camera stored in the RAM 303 (step S32) and the processing to judge whether or not any one of equipment is selected by the operation section 33 from the list of the digital camera displayed on the display section 32 are skipped. Thereby the processing for receiving the image data, which is conducted by sending the data for requiring the image data transmission to the IP address of the only one digital camera is conducted (step S34). When several equipment is stored, it is the only case that the processing for displaying the list of the digital camera on the display section (step S32) and the processing to judge whether or not the digital camera is selected by the operation section 33 (step S33) are able to be carried out. By conducting these processing, when the only one digital camera is existed in the list, the image data are able to received without conducting the processing for selecting the digital camera by the operation section. Therefore, the processing for receiving the image data is carried out promptly and more simply.

According to the above-mentioned digital camera and the system and the method for sending and receiving the image data, a control device and a terminal control device send the request data by the broadcast to the local area network by a communication device and a terminal communication device. When the control device and a terminal control device receive the response data with respect to the request data from the equipment which is connected to the local area network, the control section detects the IP address of the equipment in which the response data are sent. Therefore, the IP address of the equipment which may be the destination is automatically obtained by the control device and the terminal equipment, and the task for specifying the destination conducted by the user is reduced. The control device sends the image data directly to the equipment, which includes the detected IP address, and the camera control device sends the image data directly to the terminal equipment. Thereby, when sending the image data, the equipment, which is not the destination of the equipment, is not necessary to be existed.

The user is able to send the data by selecting the destination from the list or by sending automatically, so that the above-mentioned task for specifying the destination is further reduced.

The list of the equipment is made in advance by the control device or the terminal control device, so that the processing for sending is conducted promptly.

What is claimed is:

1. A digital camera comprising:
    a device for storing image data;
    a communication device connected to a local area network to conduct a data communication; and
    a control device to control said storing device and said communication device, wherein
    said control device controls said communication device to broadcast request data over said local area network, and when data for responding to said request data is received from a piece of equipment which is connected to said local area network, said control device detects an IP address of the piece of equipment from which said response data is sent, and sends the image data which is stored in said storing device to the piece of equipment which includes the detected IP address.

2. A digital camera according to claim 1, further comprising:
    a display device to display a list of the IP addresses detected by said control device or a list of the equipment which includes the IP addresses; and
    a selection device to select one or more of the IP addresses or the equipment displayed on said list, wherein
    said control device sends the image data stored in said storing device to the equipment which includes the one or more of the IP addresses selected by said selection device or the equipment which is selected by said selection device.

3. A method for sending image data of a digital camera, said digital camera including:
    a device for storing image data to store the image data;
    a communication device connected to a local area network to conduct a data communication; and
    a control device to control said storing device and said communication device, wherein
    said digital camera sends the image data stored in said storing device through said local area network,
    said method comprising:
    broadcasting request data to said local area network by said communication device of the digital camera;
    detecting an IP address of equipment from which response data is sent when data for responding to said request data is received from the equipment connected to said local area network; and
    sending the image data stored in said storing device to the equipment which includes the detected IP address.

4. A system for sending and receiving image data comprising:
    a digital camera; and
    a terminal equipment that broadcasts requested data,
    said digital camera including:
    a device for storing image data;
    a communication device connected to a local area network to communicate data; and
    a camera control device to detect an IP address of the terminal equipment, said IP address being included in the request data which is received through said local area network by said communication device, and to send response data including an IP address of the camera to said detected IP address of the terminal equipment, and when data for requesting an image data transmission is received from said terminal equipment in response to the response data, the camera control device sends the image data stored in said storing device to said terminal equipment in accordance with said data for requesting the image data transmission,
    said terminal equipment including:
    a terminal communication device connected to said local area network to conduct data communication; and
    a terminal control device to broadcast request data to said local area network by the terminal communication device, and to detect the IP address of said digital camera by the response data when said data for responding to said request data is received, and to send the data for requesting the image data transmission to the detected IP address, and to obtain the image data from said digital camera replied in accordance with said data for requesting the image data transmission.

5. A system for sending and receiving image data according to claim 4, wherein said terminal equipment comprises a display device to display a list of the IP address of the digital camera detected by said terminal control device or a list of the digital camera which includes the IP address and a selection device for a terminal equipment to select the IP address or the digital camera displayed on said list, and said terminal control device sends said data for requiring the image data transmission to the digital camera which includes the IP address selected by said selection device for the terminal equipment or to the digital camera selected by said selection device for the terminal equipment.

* * * * *